United States Patent

[11] 3,585,967

| [72] | Inventors | William E. Kelley<br>Euclid;<br>Richard M. Segedi, Cleveland, both of, Ohio |
|---|---|---|
| [21] | Appl. No. | 843,865 |
| [22] | Filed | Mar. 12, 1969 |
| [45] | Patented | June 22, 1971 |
| [73] | Assignee | Aquarium Systems, Inc.<br>Wickliffe, Ohio<br>Continuation-in-part of application Ser. No. 781,655, Sept. 20, 1968, now abandoned, which is a continuation of application Ser. No. 423,604, Jan. 5, 1965, now abandoned. |

[54] ARTIFICIAL SEA WATER SOLUTION AND COMPOSITION FOR PRODUCING THE SAME
9 Claims, No Drawings

| [52] | U.S. Cl. | 119/3, 99/1, 119/5 |
|---|---|---|
| [51] | Int. Cl. | A01k 61/00 |
| [50] | Field of Search | 119/3, 5; 99/1 |

[56] References Cited
OTHER REFERENCES

" Standard Specifications for Substitute Ocean Water," STANDARD OF THE AMERICAN SOCIETY FOR TESTING MATERIALS DESIGNATION: D 1141— 52, Adopted, 1952.

Harvey, H. W. THE CHEMISTRY AND FERTILITY OF SEA WATERS, Cambridge at the University Press, 1960, Pages 4 and 5.

*Primary Examiner*—Raymond N. Jones
*Assistant Examiner*—James R. Hoffman
*Attorney*—Oberlin, Maky, Donnelly & Renner ABSTRACT: An artificial sea water solution and a solid composition for making such a solution by dissolving in water. The composition includes two parts, the first part constituting about 99.9 weight percent of the total weight of the composition and contains basic salts. The second part of the composition is a solution of trace elements and constitutes about 0.1 weight percent of the total weight of the composition. The solution includes, in addition to water, the following ions: sodium, magnesium, calcium, potassium, strontium, manganese, lithium, aluminum, rubidium, zinc, cobalt, copper, chloride, sulfate, carbonate, orthophosphate, molybdate, thiosulfate, bromide, iodide and gluconate.

ARTIFICIAL SEA WATER SOLUTION AND COMPOSITION FOR PRODUCING THE SAME

DISCLOSURE

This application is a continuation-in-part of application Ser. No. 781,655, filed Sept. 20, 1968, now abandoned which application is a continuation of Ser. No. 423,604, filed Jan. 5, 1965, now abandoned.

This invention relates generally as indicated to an artificial sea water solution and to a composition for making such a solution. More particularly, it relates to an artificial sea water solution which is satisfactory not only for the live culture of marine fish but also invertebrates such as anemones, octopuses and brittlestars.

The use of artificial or synthetic sea water is extremely old, dating back at least as far as about 1854, when Gosse experimented with simple mixtures of available chemicals for use in marine aquariums when natural sea water was inaccessible. The composition of such mixtures and other similar mixtures used in the early days generally comprises only the four major salts found in natural sea water. The solutions formed when such compositions were dissolved in water required an inoculation of sea weed or some similar living organism to make them suitable for the more delicate forms of marine life, such as invertebrates. Such solutions, even when so inoculated, however, have met with only limited success and acceptance, primarily due to the inability to maintain successfully the invertebrate marine life.

The principal reason for the failure of the previously known compositions is believed to reside primarily in the approach taken to the problem, as it has generally been considered necessary to provide as close a facsimile as possible to actual sea water. The difficulty and the complexity of this task are enormous, however, since the oceans are believed to contain most of the naturally occurring elements known to man. Moreover, including the hydrogen and oxygen combined in the molecules of water, only 14 of the elements occur in concentrations of at least 1 part per million, with most of the elements occurring at considerably less than 1 part per million.

In more recent times, it has been attempted to provide a more suitable composition by producing the artificial medium in which the marine animals would best be maintained, regardless of how closely such medium resembles the composition of naturally occurring sea water. In achieving a suitable composition, the actual composition of sea water was, of course, used as a general guide in the formulation. It was recognized, however, that because sea water is so complex and therefore so extremely difficult to duplicate, it might be advisable to concentrate more on the needs of the various animals and to produce a composition and solution which would fulfill these needs. In achieving this result, the invertebrates present the major problem in that some are considerably more sensitive to the composition of the culture medium, and thus need different ingredients to be maintained successfully. It has been found, that invertebrates may be successfully cultured if the artificial composition includes some of the "trace" elements, i.e., the elements which are present in only minute quantities in naturally occurring sea water (less than 1 part per million). However, not all of such elements are required or desired, and not in the same quantities or ratios as found in naturally occurring sea water.

Compositions of this type have been used with considerable success, but have had several practical disadvantages. For example, the materials for such compositions have been available in four separate and distinct parts which must be intermixed to form a single solution, which considerably complicates packaging and handling as well as the dissolving of the various parts to form the complete solution.

It is an object of this invention, therefore, to provide an artificial sea water solution and a composition for producing such a solution which is considerably simplified in its form and which may be readily used in any existing aquarium system.

It is another object of this invention to provide an artificial sea water solution which is highly successful in the culture and maintenance of various forms of marine life over extended periods of time.

Other objects, features and advantages of this invention will be apparent to those skilled in the art after a reading of the following more detailed description.

The improved artificial sea water of this invention is an aqueous solution containing, in one formulation, the following ions in the indicated concentrations.

| Ion: | Concentration, p.p.m. |
|---|---|
| $Cl$ | 18,600 |
| $Na$ | 10,200 |
| $SO_4$ | 2,500 |
| $Mg$ | 1,200 |
| $K$ | 370 |
| $Ca$ | 470 |
| $HCO_3$ | 140 |
| $Br$ | 20 |
| $Sr$ | 8 |
| $PO_4$ | 1 |
| $Mn$ | 1 |
| $MoO_4$ | 0.6 |
| $C_6H_{11}O_7$ | 0.6 |
| $S_2O_3$ | 0.4 |
| $Li$ | 0.2 |
| $Rb$ | 0.1 |
| $I$ | 0.07 |
| $Al$ | 0.04 |
| $Zn$ | 0.02 |
| $Co$ | 0.01 |
| $Cu$ | 0.003 |

To produce the sea water solution, the necessary materials are furnished in convenient form as a two part composition. The first part is a relatively homogeneous mixture of solid basic salts in comminuted form and the second part is a concentrated solution in water of the balance of the necessary materials. The first part constitutes about 99.9 weight percent of the total weight of the composition. The second part constitutes about 0.1 weight percent of the total weight of the composition.

One preferred formulation of the two part sea water composition is set forth in the table which follows.

TABLE I

| Compound | Formula | Grade | Percent by weight | Amount (grams)[1] | | Amount times 25[2] |
|---|---|---|---|---|---|---|
| Major ingredients: | | | | | | |
| Sodium chloride (salt) | $NaCl$ | Tech | 65.270 | 10,432.625 | (23.0 lb.) | |
| Magnesium sulfate | $MgSO_4$ | Tech | 16.318 | 2,608.156 | (5.75 lb.) | |
| Magnesium chloride | $MgCl_2$ | Tech | 12.770 | 2,041.166 | (4.5 lb.) | |
| Calcium chloride | $CaCl_2$ | Tech | 3.266 | 521.631 | (1.15 'b.) | |
| Potassium chloride | $KCl$ | Tech | 1.738 | 277.825 | (9.8 oz.) | |
| Sodium, acid (baking soda) | $NaHCO_3$ | Tech | .4966 | 79.379 | (2.8 oz.) | |
| Strontium chloride | $SrCl_2.6H_2O$ | A.R. | .04692 | 7.500 | | |
| Manganese sulfate | $MnSO_4.H_2O$ | A.R. | .009384 | 1.500 | | |
| Sodium orthophosphate, mono-H. | $Na_2HPO_4.7H_2O$ | A.R. | .009384 | 1.500 | | |
| Lithium chloride | $LiCl$ | A.R. | .002346 | .375 | | |
| Sodium molybdate | $Na_2MoO_4.2H_2O$ | A.R. | .002346 | .375 | | |
| Sodium thiosulfate (hypo) | $Na_2S_2O_3.5H_2O$ | A.R. | .002346 | .375 | | |
| Totals | | | 99.931326 | 15,972.407 | (35.213 lb.) | |

3,585,967

TABLE I—Continued

| Compound | Formula | Grade | Percent by weight | Amount (grams)[1] | | Amount times 25[2] | |
|---|---|---|---|---|---|---|---|
| Trace elements: | | | | | | | |
| Potassium bromide | KBr | A.R. | .06753 | 10.795 | (.3808 oz.) | 269.89 | (9.52 oz.) |
| Calcium d-gluconate[3] | $Ca(C_6H_{11}O_7)_2 \cdot H_2O$ | U.S.P. | .001564 | .25 | | 6.25 | |
| Aluminum sulfate[3] | $Al_2(SO_4)_3$ | A.R. | .001126 | .18 | | 4.5 | |
| Rubidium chloride | RbCl | A.R. | .0003754 | .06 | | 1.5 | |
| Zinc sulfate | $ZnSO_4$ | A.R. | .0002402 | .0384 | | .96 | |
| Potassium iodine | KI | A.R. | .0002252 | .036 | | .9 | |
| Cobalt sulfate[3] | $CoSO_4$ | Feed | .0001251 | .02 | | .5 | |
| Copper sulfate | $CuSO_4 \cdot 5H_2O$ | A.R. | .00002502 | .004 | | .1 | |
| Totals | | | .07121092 | 11.3834 | (.02509 lb.) | 284.60 | (.627 lb.) |
| Grand totals | | | 100.00253692 | 35.238 lb. | | | |

[1] Amount to make 100 gal. of artificial sea water.
[2] Use amount times 25 of the trace elements and mix with 4 liters distilled water for a trace element stock solution. Sufficient for 25 batches of sea water of 100 gallons each.
[3] Requires heat to dissolve.

One procedure employed for obtaining the desired solution from the composition is as follows. The required amounts of the basic salts are placed in a suitable mixing tank, and a hard stream of tap water is directed into them to dissolve the chemicals. Additional water is added to fill the container to a level of the desired specific gravity of the solution, with the total amount of water being, for example, 100 gallons. As indicated by the foregoing table, a small amount of sodium thiosulfate has been included which neutralizes the chlorine usually present in tap water, as otherwise, the residual chlorine will displace the ionic bromine and iodine as these have a lower position in the electromotive series.

A stock solution of trace elements is then prepared, preferably using liquid stock solutions of the various ingredients to facilitate assembly of the solution and give better quantitative accuracy, since this permits the weighing out of relatively larger amounts of the individual solutions. The calcium gluconate, aluminum sulfate, and cobalt sulfate are dissolved by heat which is conveniently achieved prior to mixing with the other ingredients. After the trace elements and stock solution has been prepared, 160 ml. of such solution is added to the basic salt solution to produce a total quantity of 100 gallons of artificial sea water.

Although the formulation set forth in Table I is a preferred formulation, the solid formulation is nevertheless only for the purpose of supplying the desired ions when dissolved in water. Consequently, other salts or combinations of salts, may be used as the sources of the ions as long as the same ions in similar relative proportions are provided in the solution. For example, the magnesium of the foregoing formulation may be in the form of magnesium chloride if the amount of the latter is increased by an amount equivalent to the magnesium sulfate of such formulation. The sulfate ion may then be furnished in the form of sodium sulfate in an amount equivalent to the magnesium sulfate shown in Table I and the amount of sodium chloride reduced by an amount equivalent to the magnesium sulfate. Similarly, in the solution of trace elements, different anions may be employed as long as the effectiveness and concentration of the solution are not altered. Illustrative examples of such variations include the use of rubidium sulfate, aluminum chloride, copper chloride and cobalt chloride.

It is also permissible to have a certain amount of variation in the quantity of individual ingredients as such variation will not materially affect the suitability of the solution for the culture and maintenance of the various forms of marine life. Accordingly, the quantity of the indicated ingredients may vary as shown in the following table.

TABLE II

| Compound | Tolerance, percent | Percent by weight |
|---|---|---|
| NaCl | ±1 | 64.62–65.92 |
| $MgSO_4$ | | 16.16–16.48 |
| $MgCl_2$ | | 12.65–12.89 |
| $CaCl_2$ | | 3.24–3.30 |
| KCl | | 1.72–1.76 |
| $NaHCO_3$ | | 0.495–0.505 |
| KBr | ±5 | 0.065–0.068 |
| $SrCl_2 \cdot 6H_2O$ | | 0.045–0.049 |
| $MnSO_4 \cdot H_2O$ | | 0.0089–0.0099 |
| $NaHPO_4 \cdot 7H_2O$ | | 0.0089–0.0099 |

TABLE II—Continued

| Compound | Tolerance, percent | Percent by weight |
|---|---|---|
| LiCl | ±10 | 0.0021–0.0025 |
| $Na_2MoO_4 \cdot 2H_2O$ | | 0.0021–0.0025 |
| $Na_2S_2O_3 \cdot 5H_2O$ | | 0.0021–0.0025 |
| $Ca(C_6H_{11}O_7)_2 \cdot H_2O$ | | 0.0014–0.0018 |
| $Al_2(SO_4)_3$ | | 0.0010–0.0012 |
| RbCl | | 0.00034–0.00042 |
| $ZnSO_4$ | | 0.00022–0.00026 |
| KI | | 0.00021–0.00025 |
| $CoSO_4$ | | 0.00011–0.00014 |
| $CuSO_4 \cdot 5H_2O$ | | 0.00002–0.00003 |

When a synthetic sea water solution is made from the composition set forth in Table I, the ionic composition of the solution will be as shown in Table III which follows. Table III also shows the ionic composition of solutions prepared from compositions of the ranges of ingredients set forth in Table II.

TABLE III

| | Concentration, p.p.m. | |
|---|---|---|
| Ion | Composition of Table I | Range of composition of Table II |
| $Cl^-$ | 18,600 | 18,414–18,786 |
| $Na^+$ | 10,200 | 10,098–10,302 |
| $SO_4^{--}$ | 2,500 | 2,475–2,525 |
| $Mg^{++}$ | 1,200 | 1,188–1,212 |
| $K^+$ | 370 | 366.3–373.17 |
| $Ca^{++}$ | 470 | 465.3–474.7 |
| $HCO_3^-$ | 140 | 138.6–141.4 |
| $Br^-$ | 20 | 19–21 |
| $Sr^{++}$ | 8 | 7.6–8.4 |
| $PO_4^{---}$ | 1 | 0.95–1.05 |
| $Mn^{++}$ | 1 | 0.95–1.05 |
| $MoO_4^{--}$ | 0.6 | 0.54–0.66 |
| $C_6H_{11}O_7^-$ | 0.6 | 0.54–0.66 |
| $S_2O_3^{--}$ | 0.4 | 0.36–0.44 |
| $Li^+$ | 0.2 | 0.18–0.22 |
| $Rb^+$ | 0.1 | 0.09–0.11 |
| $I^-$ | 0.07 | 0.063–0.077 |
| $Al^{+++}$ | 0.04 | 0.036–0.044 |
| $Zn^{++}$ | 0.02 | 0.018–0.022 |
| $Co^{++}$ | 0.01 | 0.009–0.011 |
| $Cu^{++}$ | 0.003 | 0.0027–0.0033 |

One of the principal difficulties in achieving the composition of the present invention resides in the magnesium and calcium chlorides which are necessary major basic salts. Calcium and magnesium chloride are difficult to store since they have a strong tendency to interact with the other ingredients, particularly in the high concentrations of the gross components which are used. Calcium chloride may react with the magnesium sulfate to form magnesium chloride and calcium sulfate which are relatively less soluble. In the previously known compositions, the calcium chloride was packaged as a separate part to avoid difficulty. To mix the calcium chloride with the other basic salts, it was then necessary to dissolve it separately in water and subsequently add it to the mix. In the present invention, however, the calcium chloride is included as a regular ingredient of the basic salt composition, being extremely careful with regard to the moisture content of the various ingredients and particularly of the calcium chloride and/or magnesium sulfate, prior to and during storage. When the composition is dissolved in water, the calcium chloride may initially react with the magnesium sulfate to form a very slight precipitate, but the amount of such precipitate will be very small and will readily redissolve when diluted to the desired strength.

In the previously known compositions, it was also the practice to employ two separate stock solutions of trace elements. In the present invention, the trace elements have been combined into a single such solution but in very dilute form, thus avoiding the precipitation of trace elements encountered in previous attempts to combine all trace elements into a single additive solution.

Another principal distinction between this composition and those previously employed is that no nitrogen compound, such as ammonium, nitrite or nitrate is added since it has been found that most aquarium water becomes too rich in such substances as the result of the excretion of aquarium animals and the breakdown of organic substances in the aquarium water during culture use.

The artificial sea water solution and composition of this invention are suitable for use in any type of aquarium culture system, either home or commercial. The composition is also suitable for use in such other commercial operations as lobster houses or similar enterprises where it is necessary to maintain salt water marine life indefinitely.

Other modes of applying the principle of the invention may be employed, change being made as regards the details described, provided the features stated in any of the following claims, or the equivalent of such, be employed.

We therefore particularly point out and distinctly claim as our invention:

1. A two part composition which, when dissolved in water, produces a synthetic sea water solution, said composition consisting essentially of a first part constituting about 99.9 weight percent of the total weight of said composition comprising about 65.270 weight percent sodium chloride, about 16.318 weight percent magnesium sulfate, about 12.770 weight percent magnesium chloride, about 3.266 weight percent calcium chloride, about 1.738 weight percent potassium chloride, about 0.4966 weight percent sodium hydrogen carbonate, about 0.04692 weight percent strontium chloride, about 0.009384 weight percent manganese sulfate, about 0.009384 weight percent sodium orthophosphate, about 0.002346 weight percent of lithium chloride, about 0.002346 weight percent of sodium molybdate, and about 0.002346 weight percent of sodium thiosulfate related to the total weight of said composition, and a second part constituting about 0.1 weight percent of the total weight of said composition comprising about 0.06753 weight percent potassium bromide, about 0.001564 weight percent calcium gluconate, about 0.001126 weight percent aluminum sulfate, about 0.0003754 weight percent rubidium chloride, about 0.0002402 weight percent zinc sulfate, about 0.0002252 weight percent potassium iodide, and about 0.0001251 weight percent cobalt sulfate, and about 0.00002502 weight percent copper sulfate related to the total weight of said composition.

2. A two part composition which, when dissolved in water, produces a synthetic sea water solution, said composition consisting essentially of a first part comprising about 64.62 to 65.92 weight percent sodium chloride, about 16.16 to 16.48 weight percent magnesium sulfate, about 12.65 to 12.89 weight percent magnesium chloride, about 3.24 to 3.30 weight percent calcium chloride, about 1.72 to 1.76 weight percent potassium chloride, about 0.495 to 0.505 weight percent sodium hydrogen carbonate, about 0.045 to 0.049 weight percent strontium chloride, about 0.0089 to about 0.0099 weight percent manganese sulfate, about 0.0089 to 0.0099 weight percent sodium orthophosphate, about 0.0021 to 0.0025 weight percent lithium chloride, about 0.0021 to 0.0025 weight percent sodium molybdate, about 0.0021 to 0.0025 weight percent sodium thiosulfate related to the total weight of said composition, and a second part comprising about 0.065 to 0.068 weight percent potassium bromide, about 0.0014 to 0.0018 weight percent calcium gluconate, about 0.0010 to 0.0012 weight percent aluminum sulfate, about 0.00034 to 0.00042 weight percent rubidium chloride, about 0.00022 to 0.00026 weight percent zinc sulfate, about 0.00021 to 0.00025 weight percent potassium iodide, about 0.00011 to 0.00014 weight percent cobalt sulfate and about 0.00002 to 0.00003 weight percent copper sulfate related to the total weight of said composition.

3. The composition of claim 2 wherein said second part is in solution, said solution being sufficiently diluted to avoid precipitation of the ingredients constituting said other part.

4. The composition of claim 2 wherein said composition is free of nitrogen compounds.

5. An artificial sea water solution comprising the following ionic concentration: about 18414 to about 18786 p.p.m. $Cl^1$, about 10098 to about 10302 ppm $Na^+$, about 2475 to about 2525 ppm $SO_4^{--}$, about 1188 to about 1212 ppm $Mg^{++}$, about 366.3 to about 373.17 ppm $K^+$, about 465.3 to about 474.7 ppm $Ca^{++}$, about 138.6 to about 141.4 ppm $HCO_3^-$, about 19 to about 21 ppm $Br^-$, about 7.6 to about 8.4 ppm $Sr^{++}$, about 0.95 to about 1.05 ppm $PO_4^{---}$, about 0.95 to about 1.05 ppm $Mn^{++}$, about 0.54 to about 0.66 ppm $MoO_4^{--}$, about 0.54 to about 0.66 ppm $C_6H_{11}O_7$, about 0.36 to about 0.44 ppm $S_2O_3^{--}$, about 0.18 to about 0.22 ppm $Li^{++}$, about 0.09 to about 0.11 ppm $Rb^+$, about 0.063 to about 0.077 ppm $I^-$, about 0.036 to about 0.044 ppm $Al^{+++}$, about 0.018 to about 0.022 ppm $Zn^{++}$, about 0.009 to about 0.011 ppm $Co^{++}$, and about 0.0027 to about 0.0033 ppm $Cu^{++}$.

6. A composition which, when dissolved in water, produces a synthetic sea water solution, said composition comprising the following specified amounts of ingredients based on the total weight of said composition: about 65.270 weight percent sodium chloride, about 16.318 weight percent magnesium sulfate, about 12.770 weight percent magnesium chloride, about 3.266 weight percent calcium chloride, about 1.738 weight percent potassium chloride, about 0.4966 weight percent sodium hydrogen carbonate, about 0.04692 weight percent strontium chloride, about 0.009384 weight percent manganese sulfate, about 0.009384 weight percent sodium orthophosphate, about 0.002346 weight percent of lithium chloride, about 0.002346 weight percent of sodium molybdate, about 0.002346 weight percent sodium thiosulfate, about 0.06753 weight percent potassium bromide, about 0.001126 weight percent aluminum sulfate, about 0.0003754 weight percent rubidium chloride, about 0.001564 weight percent calcium gluconate, about 0.0002402 weight percent zinc sulfate, about 0.0002252 weight percent potassium iodide, and about 0.0001251 weight percent cobalt sulfate, and about 0.00002502 weight percent copper sulfate.

7. The composition of claim 6 dissolved in sufficient water to make a synthetic sea water solution.

8. The composition of claim 6 dissolved in sufficient water to provide an artificial sea water solution of the following ionic concentration: about 18,600 p.p.m. $Cl^1$, about 10,200 p.p.m. $Na^+$, about 2500 ppm $SO_4^{--}$, about 1200 ppm $Mg^{++}$, about 370 ppm $K^+$, about 470 ppm $Ca^{++}$, about 140 ppm $HCO_3^-$, about 20 ppm $Br^-$, about 8 ppm $Sr^{++}$, about 1 ppm $PO_4^{---}$, about 1 ppm $Mn^{++}$, about 0.6 ppm $MoO_4^{--}$, about 0.6 ppm $C_6H_{11}O_7^-$, about 0.4 ppm $S_2O_3^{--}$, about 0.2 ppm $Li^+$, about 0.1 ppm $Rb^+$, about 0.07 ppm $I^-$, about 0.04 ppm $Al^{+++}$, about 0.02 ppm $Zn^{++}$, about 0.01 ppm $Co^{++}$ and about 0.003 ppm $Cu^{++}$.

9. A composition which, when dissolved in water, produces a synthetic sea water solution, said composition comprising the following specified amounts of ingredients based on the total weight of said composition: about 64.62 to 65.92 weight percent sodium chloride, about 16.16 to 16.48 weight percent magnesium sulfate, about 12.65 to 12.89 weight percent magnesium chloride, about 3.24 to 3.30 weight percent calcium chloride, about 1.72 to 1.76 weight percent potassium chloride, about 0.495 to 0.505 weight percent sodium hydrogen carbonate, about 0.045 to 0.049 weight percent strontium chloride, about 0.0089 to about 0.0099 weight percent manganese sulfate, about 0.0089 to 0.0099 weight percent sodium orthophosphate, about 0.0021 to 0.0025 weight percent lithium chloride, about 0.0021 to 0.0025 weight percent sodium molybdate, about 0.0021 to 0.0025 weight percent sodium thiosulfate, about 0.065 to 0.068 weight percent potassium bromide, about 0.0010 to 0.0012 weight percent aluminum sulfate, about 0.00034 to 0.00042 weight percent rubidium chloride, about 0.0014 to 0.0018 weight percent calcium gluconate, about 0.00022 to 0.00026 weight percent zinc sulfate, about 0.00021 to 0.00025 weight percent potassium iodide, about 0.00011 to 0.00014 weight percent cobalt sulfate, and about 0.00002 to 0.00003 weight percent copper sulfate.